(12) United States Patent
Hirukawa et al.

(10) Patent No.: US 8,052,355 B2
(45) Date of Patent: Nov. 8, 2011

(54) CUTTING TOOL AND PROCESSING METHOD BY THE SAME

(75) Inventors: Toshiki Hirukawa, Kuwana (JP); Hideki Hayashi, Yokkaichi (JP); Hiroki Nakagawa, Yokkaichi (JP)

(73) Assignee: Denso Corporation, Kariya (JP)

( * ) Notice: Subject to any disclaimer, the term of this patent is extended or adjusted under 35 U.S.C. 154(b) by 1071 days.

(21) Appl. No.: 11/906,548

(22) Filed: Oct. 2, 2007

(65) Prior Publication Data
US 2008/0080939 A1  Apr. 3, 2008

(30) Foreign Application Priority Data

Oct. 3, 2006  (JP) .................................. 2006-272237

(51) Int. Cl.
*B23B 49/02* (2006.01)
(52) U.S. Cl. .................................... 408/1 R; 408/115 R
(58) Field of Classification Search .................. 408/227, 408/230, 225, 224, 211, 223, 1 R, 115 R
See application file for complete search history.

(56) References Cited

U.S. PATENT DOCUMENTS

| | | | | |
|---|---|---|---|---|
| 815,247 A | * | 3/1906 | zangerle | 408/230 |
| 2,363,085 A | * | 11/1944 | Roye | 408/72 R |
| 2,393,424 A | * | 1/1946 | Selch | 279/91 |
| 2,601,809 A | * | 7/1952 | Di Nardo | 408/83.5 |
| 2,670,795 A | * | 3/1954 | Griep | 83/185 |
| 2,918,954 A | * | 12/1959 | Miller | 408/224 |
| 4,536,108 A | * | 8/1985 | Saxton et al. | 408/230 |
| 5,967,712 A | * | 10/1999 | Magill et al. | 408/227 |

FOREIGN PATENT DOCUMENTS

| | | |
|---|---|---|
| JP | U-7-037531 | 7/1995 |
| JP | A-2004-141970 | 5/2004 |
| JP | 2004-167658 | 6/2004 |
| RU | 1775235 A1 * | 11/1992 |

OTHER PUBLICATIONS

Office Action mailed Apr. 26, 2011 issued in the corresponding JP application No. 2006-272237 with English translation thereof.

* cited by examiner

*Primary Examiner* — Daniel Howell
*Assistant Examiner* — Paul M Janeski
(74) *Attorney, Agent, or Firm* — Harness, Dickey & Pierce, PLC

(57) ABSTRACT

A cutting tool is provided to process a processed member having an opening portion with a curved inner surface, so that a through hole is formed and a part of the inner surface of the opening portion corresponding to the through hole is processed. The through hole extends from a surface of the processed member to reach the opening portion. The cutting tool includes a shank member, and a processing member having a smaller diameter than the shank member. A groove portion of the processing member has a cutting edge, and a chip evacuation groove through which chip is expelled outward. A self guide portion of the processing member is arranged between the groove portion and the shank member and provided with a substantially cylindrical shape, to guide the cutting edge toward the part of the inner surface of the opening portion corresponding to the through hole in the processing.

5 Claims, 3 Drawing Sheets

CUTTING TOOL AND PROCESSING METHOD BY THE SAME

CROSS REFERENCE TO RELATED APPLICATION

This application is based on a Japanese Patent Application No. 2006-272237 filed on Oct. 3, 2006, the disclosure of which is incorporated herein by reference.

FIELD OF THE INVENTION

The present invention relates to a cutting tool and a processing method by the same.

BACKGROUND OF THE INVENTION

Generally, with reference to JP-2004-167658A, a reduction of a damage of a cutting tool having a chip evacuation groove is disclosed. In this case, the surface of the tip of the cutting tool is coated by a hard coating to restrict the damage of the cutting tool.

FIG. 5A shows a processed member 300 which has an opening portion 310 provided with a curved inner periphery surface (which surrounds an inner space). In this case, a first expected processed portion 321 and a second expected processed portion 322 are to be processed. A first hole (e.g., through hole) is to be formed at the first expected processed portion 321 to extend from an outer surface of the processed member 300 to reach the inner periphery surface of the processed member 300. A second hole or the like is to be formed at the second expected processed portion 322 and has an opening at the inner periphery surface of the opening portion 310. The first hole and the second hole are positioned corresponding to each other. The openings of the first hole and the second hole at the inner periphery surface face each other.

In the processing of the processed member 300, the cutting tool may break when the first expected processed portion 321 has been processed and then the second expected processed portion 322 is to be processed.

That is, the processing beginning surface (inner periphery surface of opening portion 310) of the second expected processed portion 322 is a curved surface, although the processing beginning surface (outer surface of the processed member 300) of the first expected processed portion 321 is a substantially flat surface.

In this case, as shown in FIG. 5B, the cutting tool 200 will flow (move) along the processing beginning surface of the second expected processed portion 322, in the case where the first expected processed portion 321 has been processed by the cutting tool 200 and the through hole 321a has been arranged and then the second expected processed portion 322 is to be processed. At this time, the upper portion of the cutting tool 200 is arranged in the through hole 321a.

In this case, the chip evacuation groove is formed at the cutting tool, and positioned at the portion which is arranged in the through hole 321a. Thus, this portion is susceptive to breaking as compared with the case where the chip evacuation groove is not formed at this portion. Therefore, when the cutting tool 200 flows along the processing beginning surface (which is curved surface) of the second expected processed portion 322 in the state where the upper portion of the cutting tool 200 is arranged in the through hole 321a, the stress will be applied to the vicinity of the portion of the cutting tool 200 which is fixed to the through hole 321a. Thus, the cutting tool 200 will break.

Moreover, the following processing method is proposed in order to restrict the damage of the cutting tool 200. That is, as first, the first expected processed portion 321 is processed by the cutting tool 200. Thereafter, the processing beginning surface of the second expected processed portion 322 is flatted by other jig. Thereafter, the second expected processed portion 322 is processed by the cutting tool 200. However, in this case, if the processing beginning surface of the second expected processed portion 322 is flatted by the other jig, the processing time will increase. Thus, the cost will increase.

SUMMARY OF THE INVENTION

In view of the above-described disadvantage, it is an object of the present invention to provide a cutting tool which is restricted from being damaged, and a processing method by the cutting tool to reduce a processing time.

According to a first aspect of the present invention, a cutting tool is provided to process a processed member having an opening portion with a curved inner surface so that a through hole is formed at the processed member and a part of the inner surface of the opening portion corresponding to the through hole is processed. The through hole extends from a surface of the processed member to reach the opening portion. The cutting tool includes a shank member, and a processing member having a smaller diameter than the shank member. The processing member includes a groove portion and a self guide portion. The groove portion has a cutting edge which is positioned at a tip of the groove portion, and a chip evacuation groove which is positioned at an outer surface of the groove portion and through which chip generated in a processing by the cutting edge is expelled outward. The self guide portion is arranged between the groove portion and the shank member and provided with a substantially cylindrical shape, to guide the cutting edge toward the part of the inner surface of the opening portion corresponding to the through hole.

Thus, for the processed member having the opening portion with the curved inner surface, the groove portion can be guided to the part of the inner periphery surface (of the opening portion) corresponding to the through hole by the self guide portion having the substantially cylindrical shape, even in the case where the through hole extending from the surface of the processed member to reach the opening portion is formed and the part of the inner periphery surface (of the opening portion) corresponding to the through hole is processed. In this case, the state where the portion of the cutting tool having the chip evacuation groove is arranged in the through hole can be restricted. Therefore, in the case where the part of the inner periphery surface of the opening portion corresponding to the through hole is processed, the damage of the cutting tool due to the flowing of the cutting edge along the curved inner periphery surface can be restricted.

According to a second aspect of the present invention, a processing method is provided to process a processed member having an opening portion with a curved inner surface by a cutting tool, which includes a shank member and a processing member having a smaller diameter than the shank member. The processing method includes a first process and a second process. The first process is performed to form a through hole at the processed member by a groove portion of the processing member. The through hole extends from a surface of the processed member to reach the opening portion. The groove portion has a cutting edge which is positioned at a tip of the groove portion, and a chip evacuation groove which is positioned at an outer surface of the groove portion and through which chip generated in the processing is expelled outward. The second process is successively performed after the first process to process a part of the inner surface of the opening portion corresponding to the through hole by the groove portion in a state where a self guide portion of the processing member is arranged in the through hole. The self guide portion is provided between the groove portion and the shank member of the cutting tool, and has a substantially cylindrical shape to guide the cutting edge toward the part of the inner surface of the opening portion corresponding to the through hole.

Thus, the groove portion can be guided to the part of the inner periphery surface (of the opening portion) corresponding to the through hole by the self guide portion having the substantially cylindrical shape. Moreover, the state where the portion of the cutting tool having the chip evacuation groove is arranged in the through hole can be restricted. Therefore, the part of the inner periphery surface (of the opening portion) corresponding to the through hole can be processed, while the damage of the cutting tool due to the flowing of the cutting edge along the curved inner periphery surface can be restricted. Accordingly, the processed member having the opening portion with the curved inner surface can be provided with the through hole which extends from the surface of the processed member to reach the opening portion, and the part of the inner surface (of the opening portion of the processed member) corresponding to the through hole can be processed.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLED EMBODIMENTS

Exampled Embodiment

A cutting tool according to a first embodiment of the present invention will be described with reference to FIGS. 1-4B. The cutting tool can be suitably used as a drill 100, for example. The drill 100 can be rotated to process (work) a processed member which is made of a superhard alloy and the like.

Figure 1:
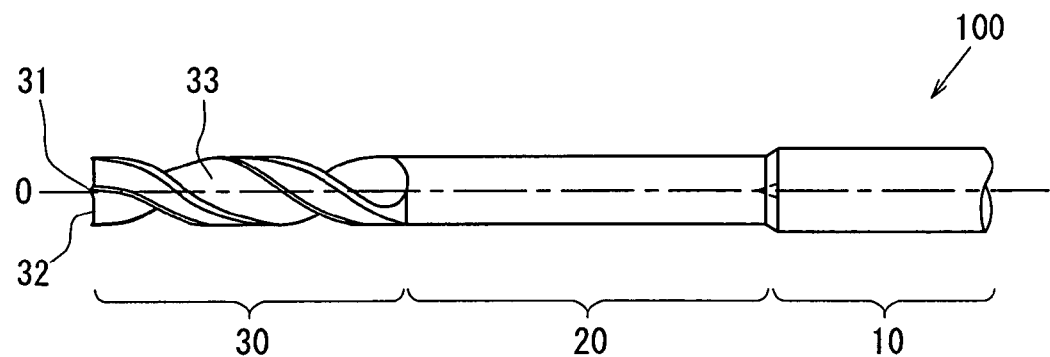
FIG. 1 is a schematic side view showing a drill according to an exampled embodiment of the present disclosure.

As shown in FIG. 1, the drill 100 can be provided with a substantially cylindrical shape having a central axis corresponding to a rotation axis O, with respect to which the drill 100 is rotated in the processing. The drill 100 includes a shank member 10 and a processing member (cutting member) which are arranged along the central axis direction of the drill 100.

The processing member has a diameter which is smaller than that of the shank member 10. For example, the diameter of the processing member can be set to be a substantial half of that of the shank member 10, to increase the strength of the boundary between the processing member and shank member. The processing member includes a groove portion 30 and a self guide portion 20. The groove portion 30, the self guide portion 20 and the shank member 10 are integrated with each other.

The self guide portion 20, having a substantially cylindrical shape, is a part where a groove such as a chip evacuation groove 33 (described later) or the like provided at the groove portion 30 are not formed. The self guide portion 20 is provided to guide the groove portion 30 (having cutting edge 32) to a second expected processed portion 460 of the inner periphery surface (which surrounds an inner space) of an opening portion 440 (space defined portion) of a processed member 400 with reference to FIG. 4B, and to restrict the drill 100 from being damaged. The opening portion 440 has an inner periphery surface which defines (surrounds) therein a space.

The groove portion 30 is provided with the cutting edge 32 arranged at the tip thereof, and the chip evacuation groove 33 which is formed at the outer surface of the groove portion 30 and through which the chip generated in the processing by the cutting edge 32 is expelled outward. Because the chip evacuation groove 33 is formed at the groove portion 30, the strength of the groove portion 30 is lower than that of the self guide portion 20 where the chip evacuation groove 33 is not formed.

The groove portion 30 can sufficiently process the processed member 400 when the groove portion 30 is provided with a length corresponding to a length of the processed portion of the processed member. In this case, when the groove portion 30 is provided with the length equal to the processed length of the processed member 400, that is, equal to a sum of the depth of a first expected processed portion 450 and that of the second expected processed portion 460, the chip can be expelled outward from the chip evacuation groove 33 of the groove portion 30 while the processed member 400 is processed.

Thus, by providing the groove portion 30 with the length corresponding to the processed length of the processed member 400, the portion which has the relatively low strength can be set to have a least possible length. Thus, the damage of the drill 100 can be further restricted.

Figure 2:
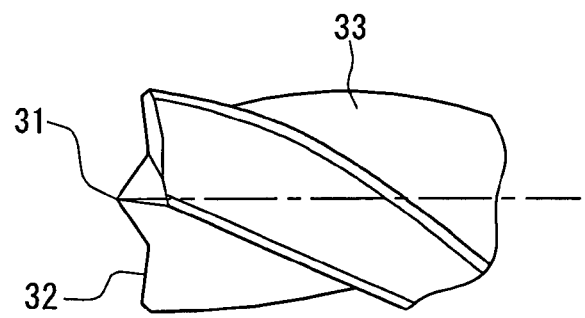
FIG. 2 is a schematic side view showing an end portion of the drill according to the exampled embodiment.

The cutting edge 32 is a part which practically processes (work) the processed member 400. The cutting edge 32 can be provided with a substantially flat shape. As shown in FIG. 2, the cutting edge 32 can be provided with a substantially flat shape which is slightly slanted to the direction of the shank member 10 with extending from the periphery toward the central axis (rotation axis O) of the drill 100.

The cutting edge 32 is provided with a protrusion 31 for keeping the processing direction of the drill 100 in the central axis direction (rotation axis direction O) thereof, that is, for making the processing direction straight. Because the cutting edge 32 is formed to have the substantially flat shape, the inner periphery surface of the opening portion 440 can be made substantially flat by the cutting edge 32 in the case where the cutting edge 32 processes the second expected processed portion 460. Therefore, the cutting edge 32 can be further restricted from flowing along the curved inner periphery surface of the opening portion 440, so that the damage of the drill 100 can be further restricted.

In this case, a pair of the chip evacuation grooves 33 are formed at the groove portion 30, and extend from the cutting edge 32 (positioned at the tip of the drill 100) to the position in immediately front of the self guide portion 20. The two chip evacuation grooves 33 can be symmetrical to each other with respect to the rotation axis of the drill 100. The chip evacuation groove 33 has a helical shape which twists to the rear side of the rotation direction of the drill when a perforation process is processed, with heading for the side of the rear end (that is, the side of shank member 10). The helical shape of the evacuation groove 33 has a central axis corresponding to the rotation axis of the drill 100.

The chip of the processed member 400 generated by the cutting edge 32 is expelled from the pressed (worked) portion. A pair of coolant supply holes through which coolant is supplied can be arranged in the drill 100 and extend from the rear end of the shank member 10 to the front end (tip end) of the cutting edge 32. In this case, the rear end and the front end are respectively arranged at the two opposite sides of the drill 100.

Next, a processing method by the drill 100 according to the exampled embodiment will be described.

The drill 100 can be suitably used to process the processed member 400 having a construction shown in FIGS. 3A-3C and 4A-4B, for example. The processed member 400 can be suitably used in an anti skid brake system of a vehicle, for example. The processed member 400 can be a housing and be provided with an opening portion where an electromagnetic valve or the like can be inserted, an opening portion 440 where a pump or the like can be inserted, a first processed portion 450a which is a through hole for constructing an oil hydraulic circuit, a second processed portion 460a (e.g., second hole), and the like.

Figure 3A:
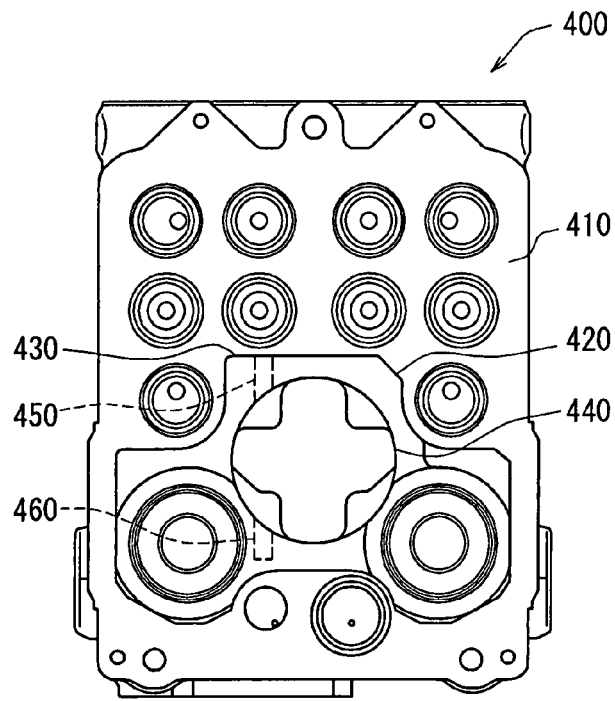
FIG. 3A is a schematic front view showing a processed member according to the exampled embodiment.
Figure 3B:
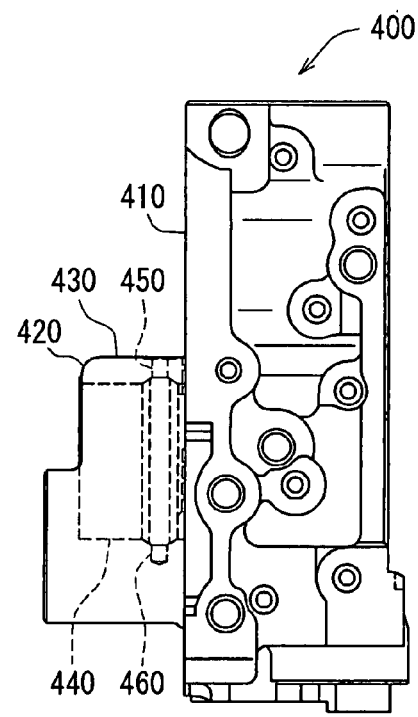
FIG. 3B is a schematic side view showing the processed member.
Figure 3C:
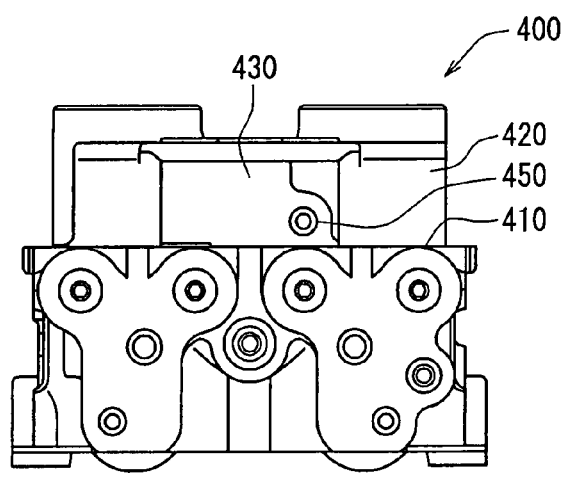
FIG. 3C is a schematic plan view showing the processed member.

As shown in FIGS. 3A-3C, the processed member 400 can have a flat portion 410 where the opening portion in which the electromagnetic valve or the like is inserted is formed. The processed member 400 has a projection portion 420, which protrudes from the flat portion 410 and is provided with the opening portion 440. The inner periphery surface (which defines therein an inner space) of the opening portion 440 is a curved surface.

The through hole 450a is to be formed by the drill 100 at the first expected processed portion 450 to extend from a surface 430 (for example, upper surface positioned at the upper side with respect to second expected processed portion 460 as shown in FIGS. 3A-4B) of the projection portion 420 to reach the inner periphery surface of the opening portion 440. That is, the through hole 450a has two openings which are respectively arranged at the surface 430 of the projection portion 420 and the inner periphery surface of the opening portion 440.

The second processed portion 460a can be, for example, the hole, and formed by the drill 100 at the second expected processed portion 460. The second processed portion 460a can have an opening, which is formed at the inner periphery surface of the opening portion 440 and arranged at a position corresponding to the opening of the through hole 450a at the inner periphery surface. For example, the through hole 450a and the second processed portion 460a can be arranged in line.

At first, a first process of the processing method is performed to form the through hole 450a at the first expected processed portion 450 by the cutting edge 32 of the drill 100. That is, the through hole 450a which extends from the surface (upper surface 430) of the processed member 400 to the opening portion 440 is formed by the cutting edge 32 of the drill 100.

Figure 4A:
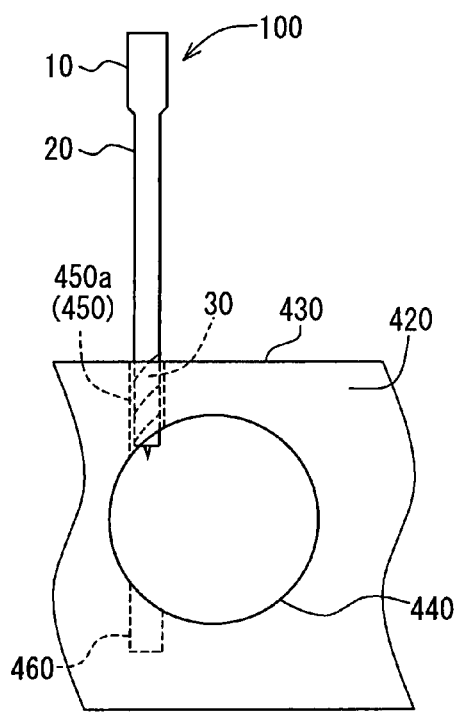
FIG. 4A is a schematic front view showing a first process of a processing method according to the exampled embodiment.
Figure 4B:
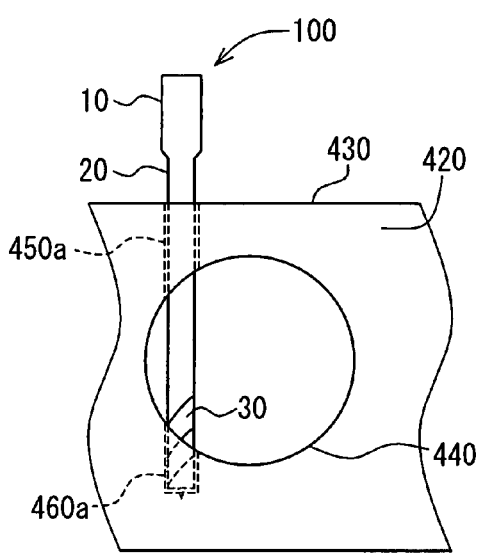
FIG. 4B is a schematic front view showing a second process of the processing method.
Figure 5A:
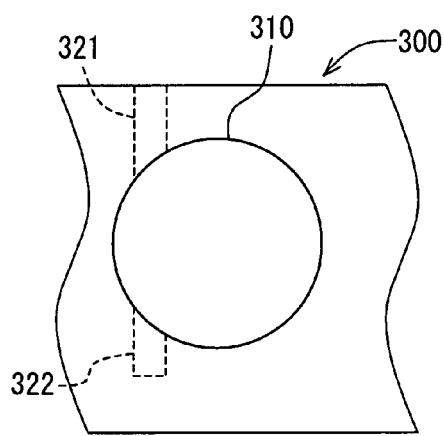
FIG. 5A is a schematic front view showing a processed member.
Figure 5B:
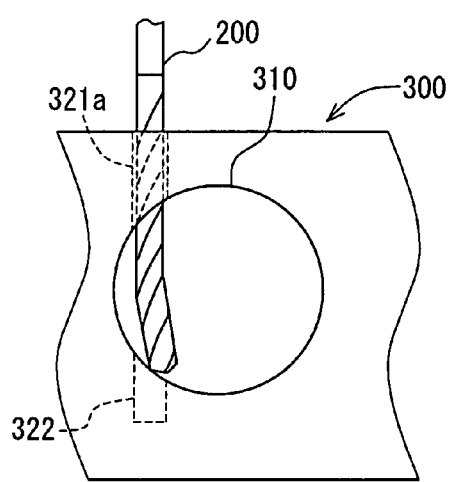
FIG. 5B is a schematic front view showing a state when the processed member is processed by a cutting tool according to a prior art.

Then, as shown in FIG. 4B (where the object field of the pressed member to be processed is omitted), successively to the first process for forming the through hole 450a, a second process of the processing method is performed to process the second expected processed portion 460 which is positioned corresponding to the through hole 450a, so that the second processed portion 460a is formed. The second processed portion 460a has an opening, which is arranged at the inner periphery surface of the opening portion and faces the opening of the through hole 450a at the inner periphery surface.

In this case, the second expected processed portion 460 is processed by the cutting edge 32 in such a manner that the self guide portion 20 is arranged in the through hole 450a.

Thus, the groove portion 30 of the drill 100 is guided to the second expected processed portion 460 by the self guide portion 20 so that the groove portion 30 where the chip evacuation groove 33 is formed can be restricted from being arranged in the through hole 450a. Therefore, the second expected processed portion 460 can be processed, while the damage caused due to the flow of the cutting edge 32 along the curved surface of the opening portion 440 can be restricted.

Accordingly, the processed member 400 which includes the opening portion 440 having the curved inner periphery surface can be provided with the through hole 450a which extends from the upper surface 430 to reach the opening portion 440, without a processing by using other jig. Moreover, the second expected processed portion 460 at the inner periphery surface of the opening portion 440 can be processed, so that the increase of the processing time can be restricted.

Other Embodiments

Although the present invention has been fully described in connection with the preferred embodiments thereof with reference to the accompanying drawings, it is to be noted that various changes and modifications will become apparent to those skilled in the art.

For example, the construction of the processed member 400 which is processed by the cutting tool according to the present invention is not limited to what has been described in the exampled embodiment. For example, the processed member 400 can be only provided with the projection portion 420 having the space defined portion 440 (opening portion), and the flat portion 410 (where the opening portion in which the electromagnetic valve or the like is inserted is formed) can be omitted.

Moreover, the opening portion 440 can be the space defined portion which is not opened at the outer surface of the processed member 400. For example, the space defined portion 440 can be formed in the processed member 400, and provided with the curved inner periphery surface (which defines therein inner space). In this case, as described in the exampled embodiment, the through hole 450a and the second processed portion 460a (e.g., hole) are respectively provided with the openings at the two portions (which face each other and are positioned corresponding to each other) of the inner periphery surface.

Such changes and modifications are to be understood as being in the scope of the present invention as defined by the appended claims.

What is claimed is:

1. A processing method for processing a processed member having an opening portion with a curved inner surface by a cutting tool which includes a shank member and a processing member having a smaller diameter than the shank member, the processing method comprising:

a first process for forming a through hole at the processed member by a groove portion of the processing member, the through hole extending from a surface of the processed member to reach the opening portion, the groove portion having a cutting edge which is positioned at a tip of the groove portion and a chip evacuation groove which is positioned at an outer surface of the groove portion and through which chip generated in the processing is expelled outward; and a second process which is successively performed after the first process to process a part of the inner surface of the opening portion corresponding to the through hole by the groove portion in a state where a self guide portion of the processing member is guided by the through hole, the self guide portion being provided between the groove portion and the shank member of the cutting tool and having a substantially cylindrical shape to guide the cutting edge toward the part of the inner surface of the opening portion corresponding to the through hole.

2. The processing method according to claim 1, wherein the first process and the second process are performed by the cutting tool having the groove portion which has a length substantially equal to a processed length of the processed member.

3. The processing method according to claim 1, wherein the first process and the second process are performed by the cutting tool having the cutting edge which has a substantially flat shape.

4. The processing method according to claim 1, wherein the first process and the second process are performed by the cutting tool having the shank member, a diameter of which is substantially twice as large as that of the processing member of the cutting tool.

5. The processing method according to claim 1, further comprising keeping a terminal end of the groove portion opposite the tip of the groove portion within the opening portion during the entire second process.

* * * * *